(No Model.)  3 Sheets—Sheet 1.

F. BROOK.
WORKMAN'S TIME CHECK.

No. 593,457.  Patented Nov. 9, 1897.

WITNESSES:
Harold C. Pole.
John O. Johnson

INVENTOR:
Frank Brook
by Herbert W. T. Jenner
Attorney.

(No Model.) 3 Sheets—Sheet 2.

F. BROOK.
WORKMAN'S TIME CHECK.

No. 593,457. Patented Nov. 9, 1897.

WITNESSES:
Harold G. Pole
John O. Johnson

INVENTOR:
Frank Brook
by Herbert W. T. Jenner.
Attorney.

(No Model.)  
3 Sheets—Sheet 3.
F. BROOK.
WORKMAN'S TIME CHECK.
No. 593,457.  
Patented Nov. 9, 1897.
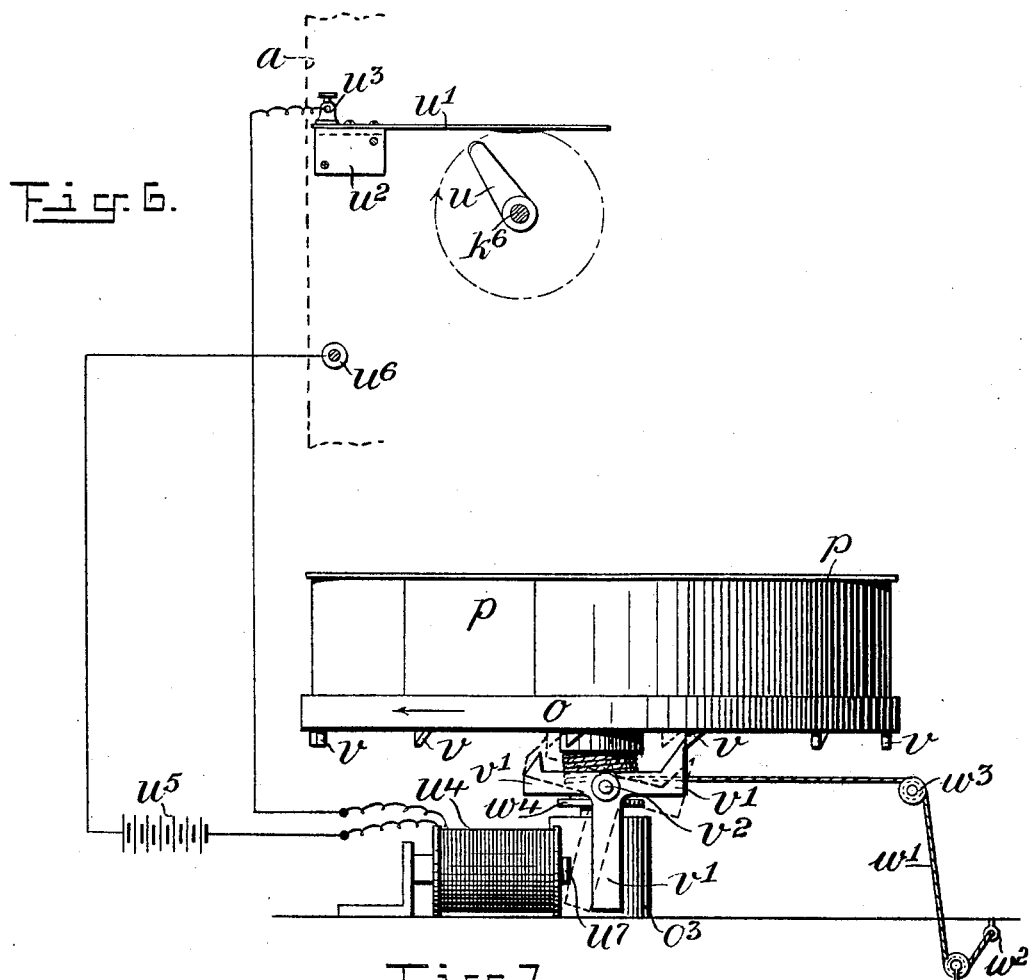
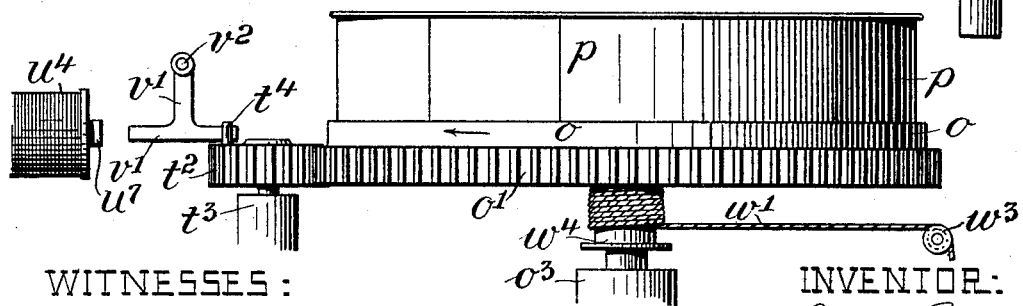
WITNESSES:  
Harold C. Pole  
John O. Johnson  
INVENTOR:  
Frank Brook  
by Herbert W. Jenner.  
Attorney

UNITED STATES PATENT OFFICE.

FRANK BROOK, OF HUDDERSFIELD, ENGLAND.

WORKMAN'S TIME-CHECK.

SPECIFICATION forming part of Letters Patent No. 593,457, dated November 9, 1897.

Application filed August 31, 1896. Serial No. 604,386. (No model.) Patented in England September 5, 1893, No. 16,662.

*To all whom it may concern:*

Be it known that I, FRANK BROOK, a subject of the Queen of Great Britain, residing at Huddersfield, in the county of York, England, have invented certain new and useful Improvements in Apparatus for Checking or Indicating the Time of Arrival and Departure of Work-People, (for which I have obtained a patent in Great Britain, No. 16,662, dated September 5, 1893;) and I do hereby declare the following to be a full, clear, and exact description of the invention, such as will enable others skilled in the art to which it appertains to make and use the same.

My invention refers to mechanism for checking or registering the periodical arrival or departure of employees.

The object of my invention is to provide efficient mechanism for recording or registering the times of arrival or departure of each employee by the successive presentation under a chute or hopper of receiving-boxes bearing thereon indication of the times at which they are by the determining action of clockwork mechanism brought in predetermined and synchronous order under said chute or hopper, into which the tokens, tallies, or checks allotted to the employees and numbered or lettered correspondingly have to be placed on entering or leaving the premises.

My invention consists of the novel arrangement, construction, and operation of mechanism for the aforesaid purpose, as will be hereinafter fully described.

Figure 1:
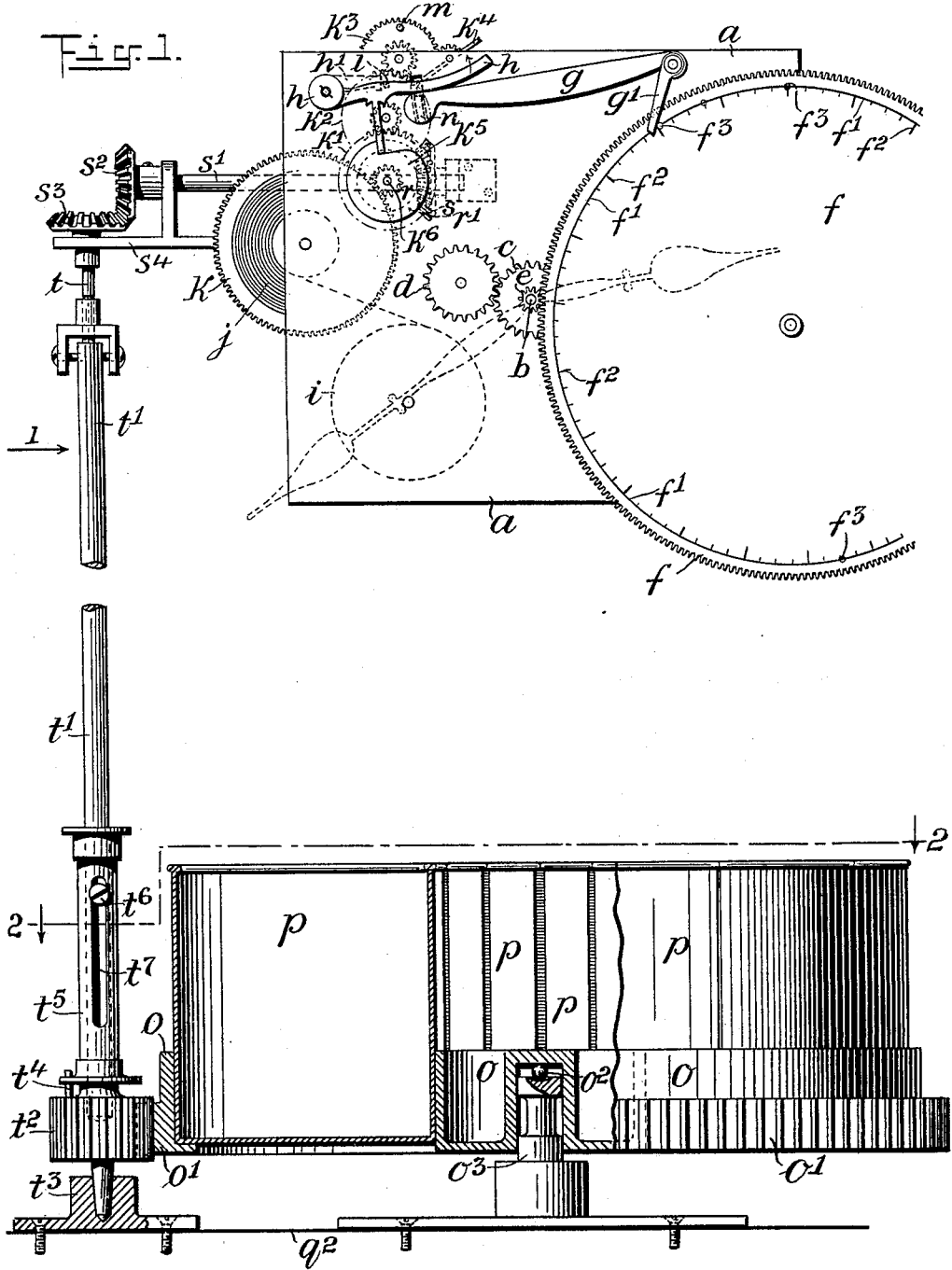
Figure 2:
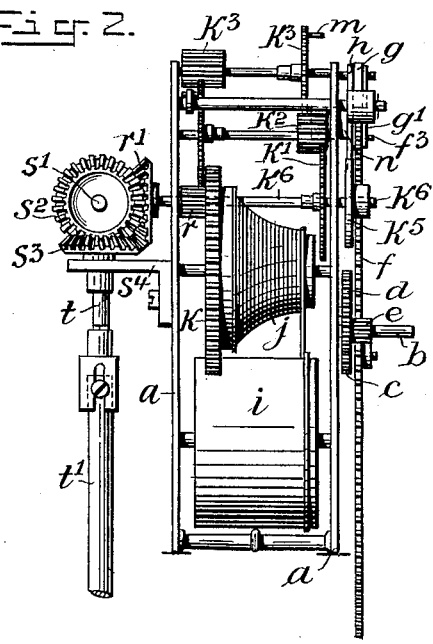
Figure 3:
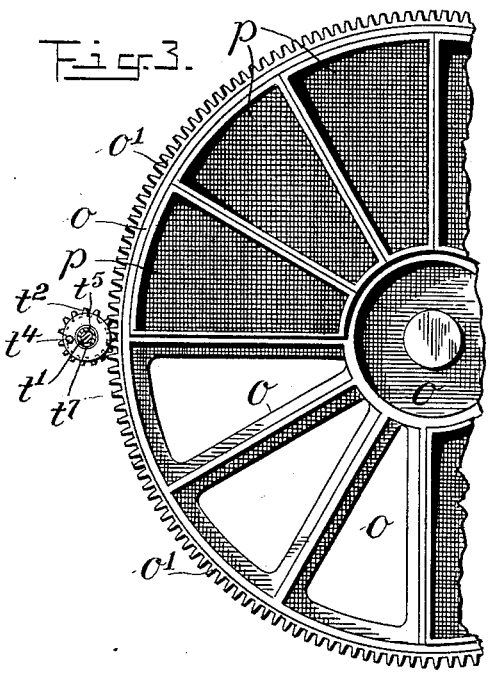
Figure 4:
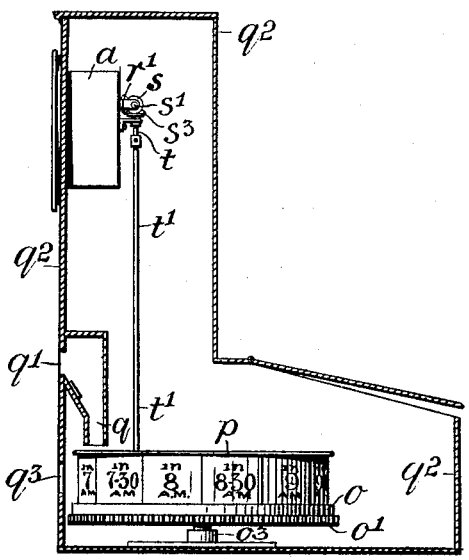
Figure 5:
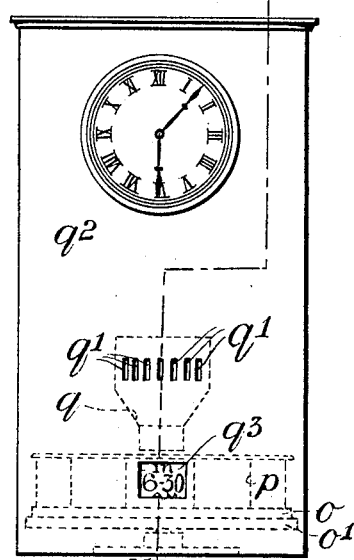

Referring to the drawings illustrating my invention, Figure 1 is a front elevation, partly in section, of the registering or checking mechanism as applied to and operated by an eight-day clock combined and coacting with the striking mechanism of a thirty-hour clock, the clock face or dial and part of the mechanism of the eight-day clock being omitted and the minute and hour hands and gearing for actuating the hour-hand being shown in dotted lines for the sake of clearness. Fig. 2 is an end elevation of the upper part of Fig. 1, looking in the direction of arrow 1. Fig. 3 is a plan, on a reduced scale, of the lower part of Fig. 1, taken in section on line 2 2. Fig. 4 is a transverse section of the box or casing inclosing the clockwork and checking or registering apparatus, taken on line 3 3 of Fig. 5. Fig. 5 is a front elevation of Fig. 4. Figs. 6 and 7 are modifications illustrating the application of an electric connection in place of a mechanical connection for actuating or determining the actuation of the registering or checking apparatus by and from the clockwork.

The same letters of reference indicate corresponding parts in all the figures.

In the drawings, letter $a$ represents the framework of the clock, $b$ the arbor or shaft on which the hour-wheel $c$ is mounted, said hour-wheel gearing with wheel $d$ and receiving motion from the ordinary mechanism of an eight-day clock, which being well known is not shown on the drawings.

On the hour-wheel arbor $b$ is mounted a pinion $e$, which gears into and drives a disk or discharge wheel or toothed plate $f$, mounted on a stud secured to the framework $a$, said discharge-plate being rotated to the extent of one revolution to every twenty-four revolutions of the hour-wheel. The face of the discharge-plate $f$ has an index-line $f'$ thereon, which is by preference marked off radially into divisions $f^2$, representing hours, these divisions being subdivided again into halves and quarters or other fractional parts or units in the form of a scale, and holes are punched or drilled at any of these divisions or intermediate thereof for the reception of studs or pins $f^3$, whose number and disposition around the discharge-wheel are determined by the periods of time at which the checking or indicating is required to take place.

In conjunction with the above mechanism I employ the striking mechanism of a thirty-hour clock, consisting of levers $g$ and $h$ for releasing said mechanism, spring-barrel $i$, fusee $j$, the train of wheels $k$ $k'$ $k^2$ $k^3$, "fly" $k^4$, and snail $k^5$, mounted on the shaft $k^6$. Connected with the lever $g$ is a short lever-arm $g'$, which is adapted to be engaged by the pins $f^3$ on the discharge-wheel as the latter rotates and to elevate the said lever $g$, which lifts the leg of the lever $h$ clear of the shoulder on snail $k^5$, while the short lever-arm $h'$, secured on the same stud as the lever $h$, is at the same time placed clear of the pin $l$ on the toothed wheel $k^2$, whereby the mechanism is temporarily released and is put in motion by the uncoiling of the spring in the barrel $i$. The motion of the parts, however, is only temporary, so as to bring the larger diameter of the snail $k^5$ under the depending leg of lever $h$, and is arrested by the pin $m$ on wheel $k^3$ engaging a projection $n$ on the end of lever $g$, but immediately the pin $f^3$, in engagement with the lever-arm $g'$, rides clear of said lever-arm the lever $g$ assumes it normal position and releases the wheel $k^3$ and therefore the motor or striking mechanism, whereupon the action of the coiled spring causes the parts to be rotated until the cam or snail $k^5$ has completed a revolution and is again locked by the depending foot of lever $h$, as shown on the drawings. The parts remain in the positions shown in Fig. 1 and inoperative until a second pin on the discharge-wheel actuates the lever-arm $g'$, when they are operated, as previously described, and this is repeated each time a pin $f^3$ on the rotating discharge-wheel $f$ engages the lever-arm $g'$.

The intermittent motion obtained as above set forth is for the purpose of rotating at predetermined periods the frame or drum $o$ (in which are loosely placed the boxes $p$ for receiving the workmen's tokens or checks) to the extent of one box, so as to bring another box under the chute $q$ to receive the checks of workmen arriving after a given time and before the expiration of the next given period. The means I employ for transmitting such motion to the frame or drum $o$ consists of a pinion $r$, mounted on the snail-shaft $k^6$ and gearing with the spur-wheel $k$ on the fusee $j$; or, if no fusee be employed, a pinion mounted on a stud and gearing with a spur-wheel on the spring-barrel $i$ may be substituted for the arrangement shown. On the same shaft $k^6$ is mounted a bevel-wheel $r'$, gearing into a bevel-wheel $s$, secured on a short shaft $s'$, on which is a second bevel-wheel $s^2$, gearing with a bevel-wheel $s^3$, supported by a bracket $s^4$ and having a square-ended spindle $t$, which enters into the end of and is adapted to rotate a vertical shaft $t'$. At the lower end of the said vertical shaft, but not connected therewith, is a pinion $t^2$, supported in a footstep $t^3$ and engaging with the teeth of the spur-wheel $o'$, cast on or attached to the drum $o$. The pinion $t^2$ carries a stud or pin $t^4$, which is adapted to enter a corresponding opening formed in the flange at the base of a hollow sleeve or tube $t^5$, placed on the shaft $t'$. The said sleeve is secured to the shaft so as to rotate therewith by means of a set-screw $t^6$, passing through a slot $t^7$ in the sleeve, but such sleeve is capable of being moved up and down the shaft to place it out of or into engagement with the pin $t^4$ to disconnect the drum or frame $o$ from the operative mechanism or connect it therewith. When disconnected, the drum or frame can be turned round to examine the contents of all the boxes or to change the order of said boxes or for other purposes without interfering with the clockwork mechanism.

It will be seen from the above that each time the escapement or striking mechanism is released by a peg or pin on the the discharge-wheel $f$, engaging and lifting the lever-arm $j'$, and the snail $k^3$ rotated to the extent of one revolution, the pinion $t^2$ will likewise be rotated to the extent of one revolution through the medium of bevel-wheels $r'$, $s$, $s^2$, and $s^3$ and shaft $t'$, and the number of teeth on said pinion being equal to the number of teeth between each division of or in each section into which the frame or drum $o$ is divided the last named will be rotated to the extent of one division and bring the next box $p$ under the chute $q$, into which the tokens or checks are placed by the workman, who introduces them through slots $q'$ in the framework or case $q^2$ inclosing the time-checking apparatus.

The boxes or divisions of the drum or frame $o$ are marked to accord with the time at which they are to be brought under the chute $q$, as indicated at Fig. 5, and said boxes are removable at will. Each workman or operative is provided with a check or token, numbered or lettered to indicate to whom it belongs, and as the time at which each box is presented under the chute is exhibited through an opening $q^3$ in the case $q^2$ the particular boxes into which the tokens or checks are deposited establishes, without question, the time of arrival or departure of the workmen and there is no disputing of the record.

As an illustration of the action of the apparatus I will assume that work commences at seven o'clock a. m. and that three minutes' grace is allowed. The box marked "7" will remain under the chute $q$ until the minute-hand of the clock indicates three minutes past seven, whereupon a pin $f^3$ on the discharge-wheel $f$ will release the escapement or striking mechanism, as before fully described, and cause the frame or drum $o$ to be rotated to the extent of one box, moving the box marked "7" from under the chute and presenting the next box marked at any required time—say 7.15—in its place. Into this box those coming between three minutes past seven and eighteen minutes past seven will deposit their checks, and their time of arrival therefore be recorded as 7.15, this being repeated as many times during the day as may be required and at any predetermined time.

The frame or drum $o$ may be constructed to hold any number of boxes $p$, the number of teeth between each division, however, always being equal to those on the pinion $t^2$.

The drum or frame $o$ is supported by and rotates upon a ball-bearing $o^2$, as shown at Fig. 1, the ball or balls resting on a stud $o^3$, secured to the bottom of the case $q^2$.

Instead of effecting the periodical partial rotation of the drum or frame $o$ mechanically or by gearing actuated by the striking mechanism of the clock in the manner set forth above, the same result may be obtained by an electrical connection established between the striking mechanism and the registering or checking apparatus, as hereinafter described.

Referring to Fig. 6, in which the clockwork and striking mechanism with the exception of snail-shaft $k^6$ is omitted and a portion of the frame $a$ shown in dotted lines, letter $u$ represents a switch or cam which is fast on the rear end of the snail-shaft $k^6$ and rotates therewith to the extent of one revolution each time the striking mechanism is set in motion by a pin or stud $f^3$ on the discharge-plate $f$ engaging with and then releasing the lever-arm $g'$, as fully set forth. The end of the switch or nose of the cam $u$ is tipped with silver and is adapted at each revolution to engage with the silvered under surface of a spring or contact piece $u'$, carried by an insulating-bracket $u^2$, secured to the frame $a$ and insulating said contact-piece from the clock. To the contact-piece $u'$ is secured a terminal $u^3$, connected by wire to one end of a coil on bobbins forming the electromagnet $u^4$, the opposite end of the coil being connected to one pole of a battery $u^5$, whose opposite pole is connected to the terminal $u^6$, secured to frame $a$ of the clock, the whole forming an electric circuit which is adapted to be completed and broken by the switch or arm $u$ engaging with and riding clear of the contact-piece $u'$.

On the under side of the drum or frame $o$ at the same radii and at equidistances apart corresponding to the sections into which the drum is divided are cast or secured studs or teeth $v$, with which is adapted to engage in succession a double pallet $v'$, mounted loosely on a stud $v^2$. The said pallet normally occupies the position shown in full lines, the tooth on the right-hand end thereof being rather longer than the tooth on the left-hand end, so as to engage with a stud $v$, as shown, to hold the drum in position during the period of time each box on the drum $o$ has to remain under the chute to receive the employees' checks or tallies, while the shorter tooth on the left is clear of the path of the studs $v$.

When the striking mechanism is set in motion by the determining action of a pin $f^3$ on the discharge wheel or plate $f$, the switch or lever arm $u$ during a part of its revolution is brought into engagement with the contact piece or spring $u'$ and completes the electric circuit, the current flowing through the armature of the electromagnet and magnetizing the core $u^7$, which consequently attracts the pallet $v'$ and tilts it into the position shown in dotted lines, thereby placing the tooth on the right hand of the pallet clear of the stud it has been engaged with and bringing the tooth on the left hand into the path of the studs. On the drum $o$ being thus released the gravity action of a weight $w$, suspended from a cord $w'$, which is attached at one end to a fixed eyelet $w^2$, then passed over a pulley $w^3$ and fastened at its opposite end to the drum $o$ and wound or coiled a few times round a barrel $w^4$ on the base of the drum $o$, causes a portion of the cord $w'$ to be unwound off the said barrel and rotates the drum $o$ slightly in the direction of the arrow until the preceding stud abuts against the left-hand tooth of the pallet, as indicated by dotted lines, which momentarily arrests the motion of the drum. Immediately the circuit is broken by the switch or arm $u$ riding clear of the contact-piece $u'$ the pallet by its own weight rights itself, and assuming the normal position shown in full lines places its right-hand tooth in the path of the next succeeding stud $v'$ and its left-hand tooth clear of the stud it has been abnormally engaged with, whereupon the drum is again rotated until stopped by the engagement of the said next succeeding stud $v'$ with the right-hand tooth of the pallet and its partial rotation to the extent of one section or box thus made and completed.

The parts operate in practice with considerable rapidity, so that the change from one box $p$ to another is quickly effected. The drum can be rotated in the contrary direction to rewind on the cord $w'$ without affecting any of the other parts of the mechanism.

In Fig. 7 I show a slight modification consisting in the retention of the spur-wheel $o'$ on the drum $o$ and the pinion $t^2$, journaled in bearings in the foot-step $t^3$ and carrying the stud or pin $t^4$. The electric circuit is arranged and the circuit completed and broken, as above described, the completion of the circuit causing the pallet $v'$ to be attracted by the core $u^7$ clear of the stud $t^4$ and releasing the pinion $t^2$ and drum $o$, which are then rotated by the uncoiling of the cord $w'$ off the barrel $w^4$ by the gravity action of a weight $w$, as described with reference to Fig. 6, until the pinion $t^2$, having completed a revolution, is stopped and held by the reëngagement of the stud $t^4$ with the pallet $v'$, which has righted itself in the meantime by the breaking of the electric circuit.

The contact of the switch or cam $u$ with the contact-piece $u'$ may be long or short by lengthening or shortening the dwell on the end of said switch or cam.

I have shown and described the method of actuating the drum or frame $o$ to bring about a change of box at predetermined periods by electrical connection with an eight-day clock having combined therewith the striking mechanism of a thirty-hour clock for the reason that in some business premises there are two or more entrances for the employees and time checking or registering apparatuses being required at each entrance one central clock of the description set forth will serve to determine and control through electric circuits established between same and each checker the periodical action of the several checkers and save the expense of a separate clock for each.

I claim as my invention—

1. In time registering or checking mechanism for receiving the checks or tallies of employees on entering or leaving the business premises, the combination, with the hour-hand arbor of an eight-day clock, of a pinion mounted thereon, a discharge-wheel mounted on a stud secured to the clock-frame and having teeth thereon meshing with the teeth of said pinion which, in every twenty-four revolutions, gives one complete revolution to the discharge-wheel, and provided on its face with a scale representing equal divisions or periods or units of time, studs or pins secured in holes drilled or bored in the discharge-wheel at any division on the scale or intermediate of any division thereon, a lever-arm adapted to be engaged by pins or studs on the discharge-wheel, means comprising the motor mechanism of a thirty-hour clock coacting with said lever-arm, a bevel-wheel mounted on the snail-shaft of the said motor mechanism and rotated thereby to the extent of one revolution when released by a pin on the discharge-wheel, a horizontal shaft supported in brackets secured to the clock-frame and carrying bevel toothed wheels meshing respectively with the beveled toothed wheel on the snail-shaft and with a beveled toothed wheel on a short square-ended spindle, a vertical shaft adapted to be engaged and rotated by and with said square-ended spindle, a pinion mounted in bearings in a foot-step and receiving motion from the vertical shaft, and a drum or frame mounted on a ball-bearing and having thereon a spur-wheel which meshes with the said pinion and is rotated thereby at each revolution communicated to it from the motor mechanism, to the extent of one check-receiving box or section into which the drum is radially divided, substantially as described.

2. In mechanism for receiving the checks or tallies deposited by employees on entering or leaving business premises and checking or registering the time of such deposit, the combination, with the hour-hand arbor of an eight-day clock, of a pinion $e$, a discharge-wheel $f$ in mesh with said pinion, having on its face a graduated time scale or index by which the positions of pins or studs can be accurately set off, pins or studs $f^3$ secured to the discharge-wheel at the same radii and at such intervals apart as will accord with the times at which the checking mechanism is to be actuated to remove one check-receiving box from under the deposit-chute and place the next succeeding box thereunder and the periods of time each box shall remain under the chute, a lever-arm $g'$, motor mechanism comprising levers $g$, $h$, and $h'$, spring-barrel $i$, fusee $j$, train of wheels $k$, $k'$, $k^2$, $k^3$, pinion $r$, studs $l$, $m$, on wheels $k^2$ and $k^3$ respectively, and projection $n$ on rear side of lever $g$, all coacting, when released by a pin on the discharge-plate $f$, as set forth, a beveled toothed wheel $r'$ mounted on the snail-shaft $k^5$, a beveled toothed wheel $s$ in mesh therewith mounted on one end of a short shaft $s'$ having a second beveled toothed wheel $s^2$ mounted on its opposite end, a beveled toothed wheel $s^3$ meshing with the beveled toothed wheel $s^2$, a spindle $t$ carrying said beveled toothed wheel $s^3$ and adapted to engage with and rotate a vertical shaft $t'$ fitting loosely at its lower end into a recess in the face of the pinion $t^2$, a hollow sleeve or tube $t^5$ secured by set-screw $t^6$ on the shaft $t'$ so as to rotate therewith, and having a flange at its base through which is a hole or opening corresponding to a pin or stud $t^4$ secured to the face of the pinion $t^2$ which is adapted to enter and engage same to communicate motion to the pinion $t^2$, a slot $t^7$ in said sleeve through which the set-screw $t^6$ is passed to allow for the endwise movement of the sleeve to place it out of engagement with the stud $t^4$ and disengage the checker from the clockwork mechanism, a pinion $t^2$, a drum or frame $o$ divided radially into sections corresponding to the number of boxes to be employed and having a spur-wheel $o'$ thereon with the same number of teeth in or between each section as there are teeth on the pinion $t^2$, and check-receiving boxes $p$ adapted to fit loosely into the sectional divisions of the drum or frame $o$, substantially as described.

3. In mechanism for registering or checking the precise time of deposit of employees' checks or tokens, the combination with an eight-day clock, motor mechanism comprising the striking mechanism of a thirty-hour clock, a discharge-wheel deriving motion from the hour-wheel arbor of the clock, pins or studs secured to said discharge-wheel at predetermined intervals apart and forming the means for determining and controlling the actuation of the motor mechanism and through said mechanism the operation of the checker or register, a lever-arm connected with the motor mechanism and adapted to be engaged by the pins on the discharge-wheel, and means coacting with said mechanism to transmit motion therefrom to the checking or registering mechanism, of a shaft $t'$, sleeve $t^5$ secured to said shaft so as to rotate therewith and having a slot $t^7$ by which it is movable endwise to disengage the clockwork mechanism from the registering drum or frame, a pinion $t^2$ having a stud thereon with which said sleeve is adapted to be engaged to rotate the pinion, a drum or frame $o$, a spur-wheel $o'$ on said drum adapted to mesh with and be driven by the pinion at each revolution thereof to the extent of a section of the drum, or one check-receiving box, check-receiving boxes $p$ fitting loosely into each section of the drum $o$ and bearing on their outer sides letters or figures denoting the times they are to be brought into position, for receiving the employees' checks or tokens, a hopper or chute $q$ to guide the checks or tallies into the box under same, slots $q'$ cut in the outer case or box inclosing the checker, through which the checks or tallies are introduced by the employees, and an opening $q^2$ to exhibit at the front of the case the figures or letters on the check-receiving box brought into position under the chute, substantially as described.

In testimony whereof I have affixed my signature in presence of two witnesses.

FRANK BROOK.

Witnesses:
TOM COMYN,
THOMAS H. BARRON.